US007405903B2

(12) United States Patent
Taya et al.

(10) Patent No.: US 7,405,903 B2
(45) Date of Patent: Jul. 29, 2008

(54) STRUCTURE OF INSTALLING INFORMATION PROCESSOR

(75) Inventors: Kazuaki Taya, Kawasaki (JP); Takashi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 620 days.

(21) Appl. No.: 11/068,472

(22) Filed: Feb. 28, 2005

(65) Prior Publication Data

US 2006/0107711 A1 May 25, 2006

(30) Foreign Application Priority Data

Nov. 19, 2004 (JP) ............................ 2004-336569

(51) Int. Cl.
*G11B 33/14* (2006.01)

(52) U.S. Cl. .................................................. 360/97.02

(58) Field of Classification Search .............. 360/97.02; 720/651, 657; 361/684, 685, 686
See application file for complete search history.

(56) References Cited

U.S. PATENT DOCUMENTS 6,671,124 B2 * 12/2003 Guion et al. ............. 360/97.02
6,873,524 B2 * 3/2005 Kaczeus et al. ............. 361/685
2004/0133903 A1 * 7/2004 Hayakawa .................. 720/651
2006/0193111 A1 * 8/2006 Han ........................... 361/683

FOREIGN PATENT DOCUMENTS

| | | |
|---|---|---|
| JP | 7-057445 | 3/1995 |
| JP | 11-232860 | 8/1999 |
| JP | 2001-057066 | 2/2001 |
| JP | 2001-202767 | 7/2001 |

* cited by examiner

*Primary Examiner*—Allen T Cao
(74) *Attorney, Agent, or Firm*—Greer, Burns & Crain, Ltd.

(57) ABSTRACT

A structure for installing an information processor into an electronic equipment includes a biasing unit provided in the information processor; and a projection portion provided in a housing of the electronic equipment. In the structure, the protruding portion biases the biasing unit and the biasing unit applies a predetermined pushing force to the housing via the protruding portion when the information processor is installed in the housing.

6 Claims, 11 Drawing Sheets

STRUCTURE OF INSTALLING INFORMATION PROCESSOR

BACKGROUND OF THE INVENTION

1) Field of the Invention

The present invention relates to a structure of installing an information processor such as a hard disk drive (HDD) in an electronic equipment such as a disk array device.

2) Description of the Related Art

So-called residual vibrations arise before a head (data reader) of an actuator of a hard disk drive (hereinafter, "HDD") is positioned at a center of a target track. The residual vibrations are generated when the actuator of the HDD moves, or a medium of the HDD rotates. The residual vibrations are also generated, due to external vibrations, when an installed rocker shakes or another HDD installed in the same electronic equipment vibrates.

The head sometimes comes off the target track due to such vibrations, which is called the off-track phenomenon, and the performance of the device thereby deteriorates. Accordingly, in order to reduce such residual vibrations, the vibration of the HDD must be suppressed. A known technique for suppressing vibrations of the HDD is shown in FIGS. 10 and 11.

FIG. 10 is a side view of a conventional installation structure of an information processor, and FIG. 11 is an enlarged view of a portion C shown in FIG. 10. As shown in FIG. 10, an HDD 10 is installed between an upper chassis 120 and a lower chassis 130 of the electronic equipment. An interval between the upper chassis 120 and the lower chassis 130 is set to be slightly larger than a height of the HDD 10.

A U-shaped supporting member 15 is provided at the HDD 10 so as to surround a ceiling surface, a front surface, and a bottom surface thereof. Plate springs 140 and 150 are provided at a front portion and a rear portion of the ceiling surface of the supporting member 15, respectively.

As shown in FIGS. 10 and 11, when the HDD 10 is inserted between the chassis 120 and 130 and after insertion is completed, the plate springs 140 and 150 abut the upper chassis 120 so as to reduce the residual vibrations by biasing forces of the plate springs 140 and 150. Japanese Patent Application Laid-Open No. 2001-202767 discloses such a technique of installing the HDD in the electronic equipment by using a plate spring.

The plate springs 140 and 150 may be made stiff in order to reduce the residual vibrations. However, if the plate springs 140 and 150 are merely made stiff, frictional force between the plate springs 140 and 150 and the upper chassis 120, and frictional force between the HDD 10 and the lower chassis 130 increase. Therefore, it becomes difficult to insert the HDD 10 between the chassis 120 and 130, and the usability deteriorates.

Another problem occurs in a disk array device. A disk array device is an electronic equipment in which a plurality of HDDs are installed. The disk array device is often equipped with a residual-vibration countermeasure mechanism and a security mechanism (locking mechanism) such that the HDDs cannot be easily taken-out and data security is maintained.

However, the residual-vibration countermeasure mechanism and the security mechanism (locking mechanism) are not integral, and these mechanisms are provided separately. Therefore, the number of parts is large and the device structure is complex.

SUMMARY OF THE INVENTION

It is an object of the present invention to at least solve the problems in the conventional technology.

A structure for installing an information processor into an electronic equipment includes a biasing unit provided in the information processor; and a projection portion provided in a housing of the electronic equipment. In the structure, the protruding portion biases the biasing unit and the biasing unit applies a predetermined pushing force to the housing via the protruding portion when the information processor is installed in the housing.

The other objects, features, and advantages of the present invention are specifically set forth in or will become apparent from the following detailed description of the invention when read in conjunction with the accompanying drawings.

DETAILED DESCRIPTION

Exemplary embodiments of the present invention will be explained in detail below with reference to the accompanying drawings. The embodiments are not intended to limit the present invention.

Figure 1:
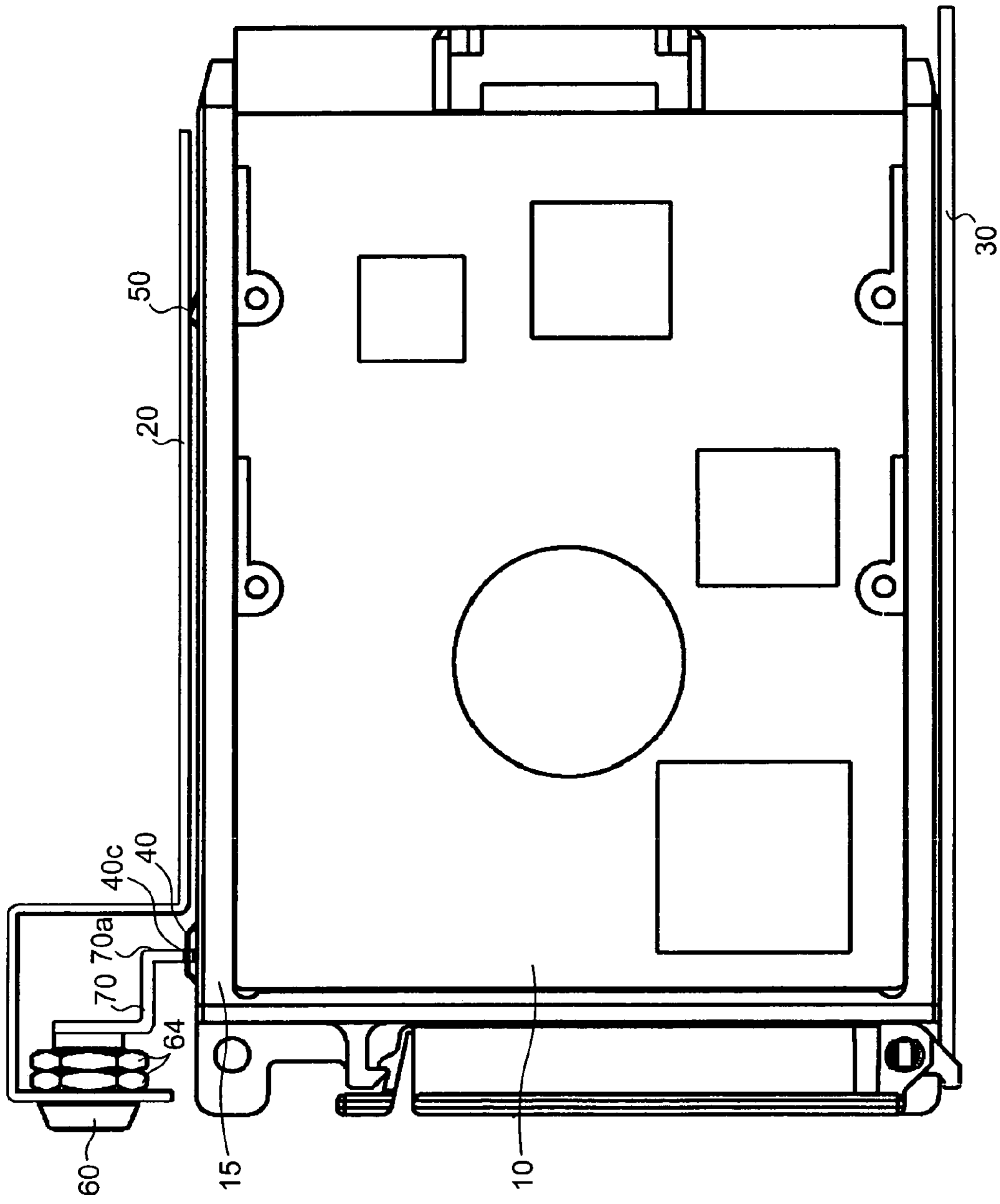
FIG. 1 is a side view of an installation structure of an information processor-according to a first embodiment of the present invention.
Figure 2:
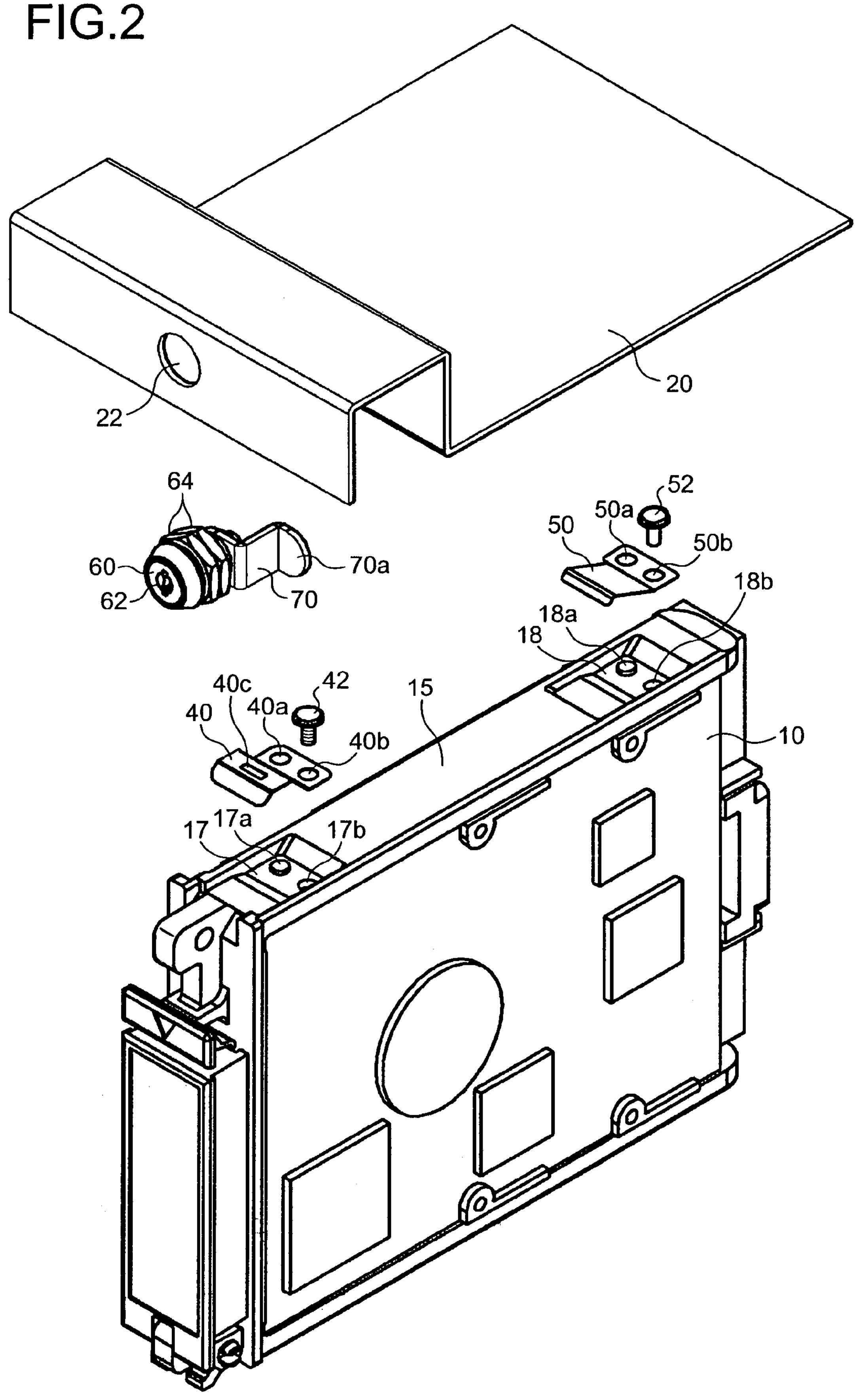
FIG. 2 is an exploded perspective view of the installation structure shown in FIG. 1.
Figure 3:
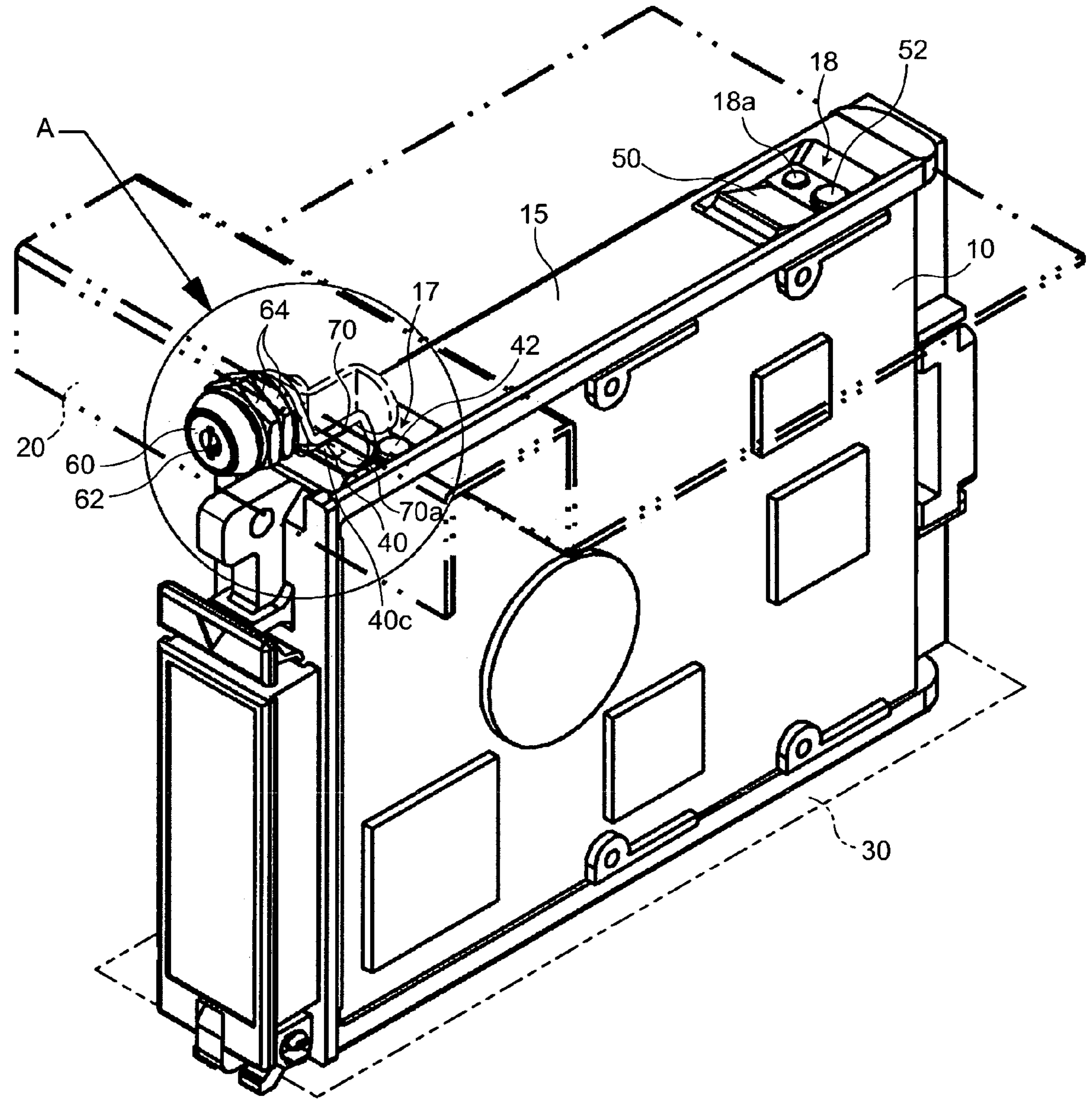
FIG. 3 is an assembled perspective view of the installation structure shown in FIG. 1.
Figure 4:
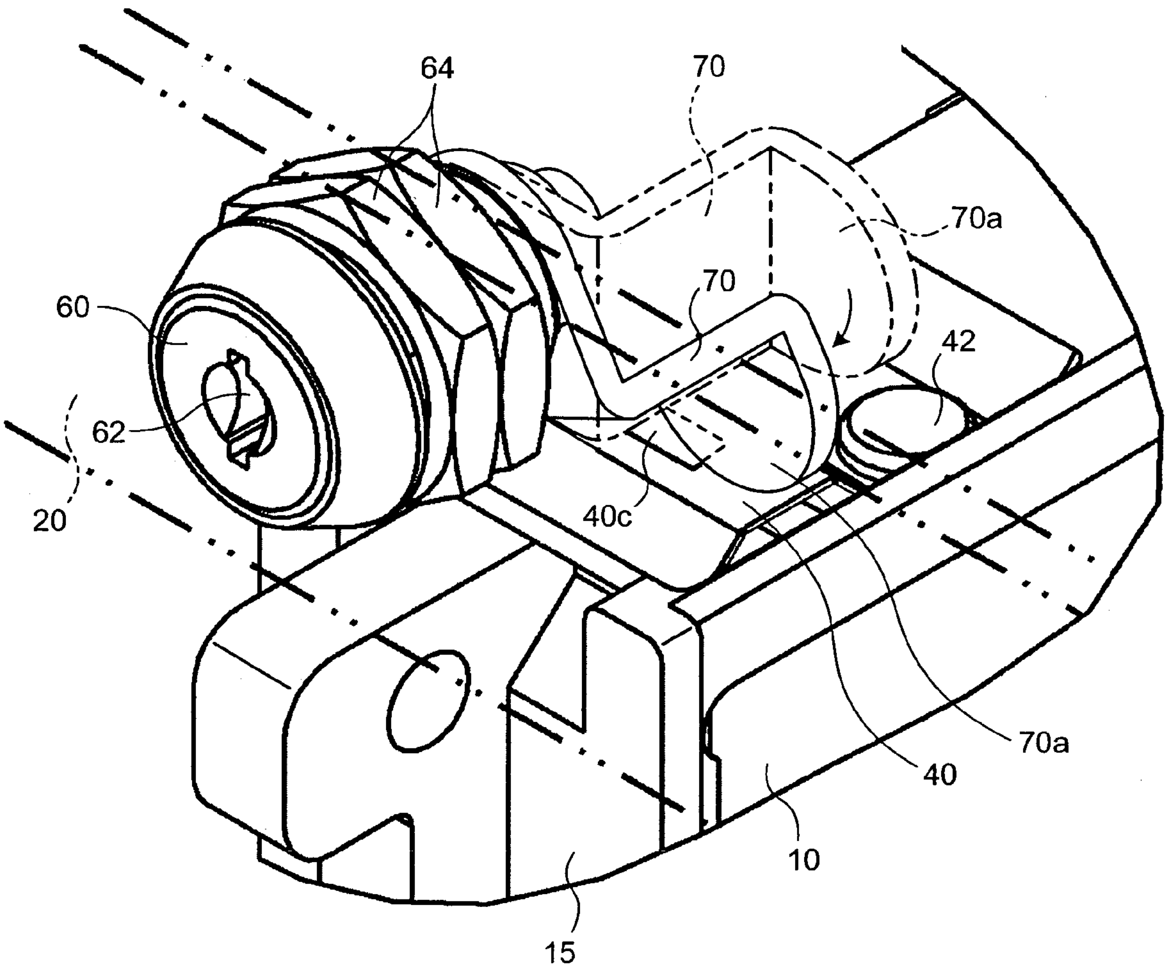
FIG. 4 is an enlarged perspective view of a portion A shown in FIG. 3.

FIG. 1 is a side view of an installation structure of an information processor according to a first embodiment of the present invention, FIG. 2 is an exploded perspective view of the installation structure of the information processor, FIG. 3 is an assembled perspective view of the installation structure of the information processor, and FIG. 4 is an enlarged perspective view of a portion A shown in FIG. 3.

Figure 5:
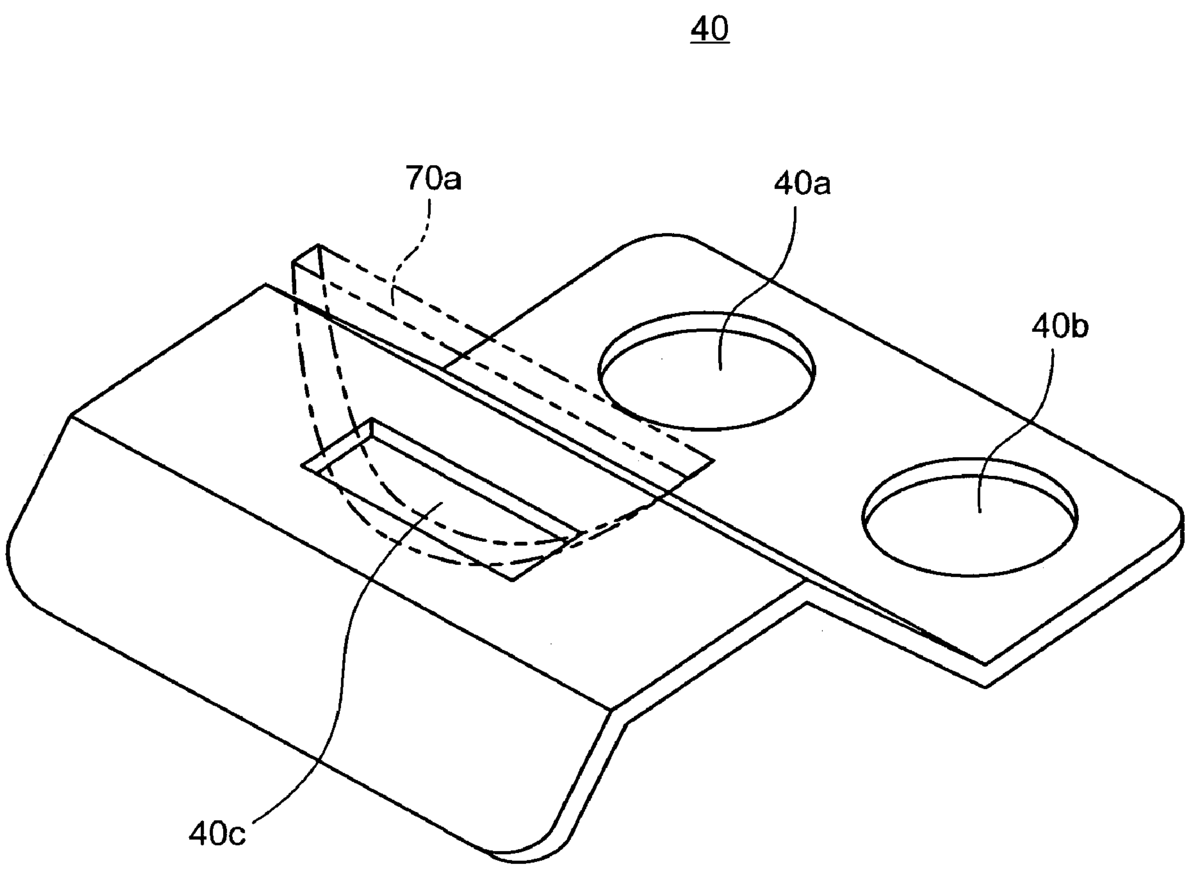
FIG. 5 is a perspective view of a plate spring having a hook receiving hole.
Figure 6:
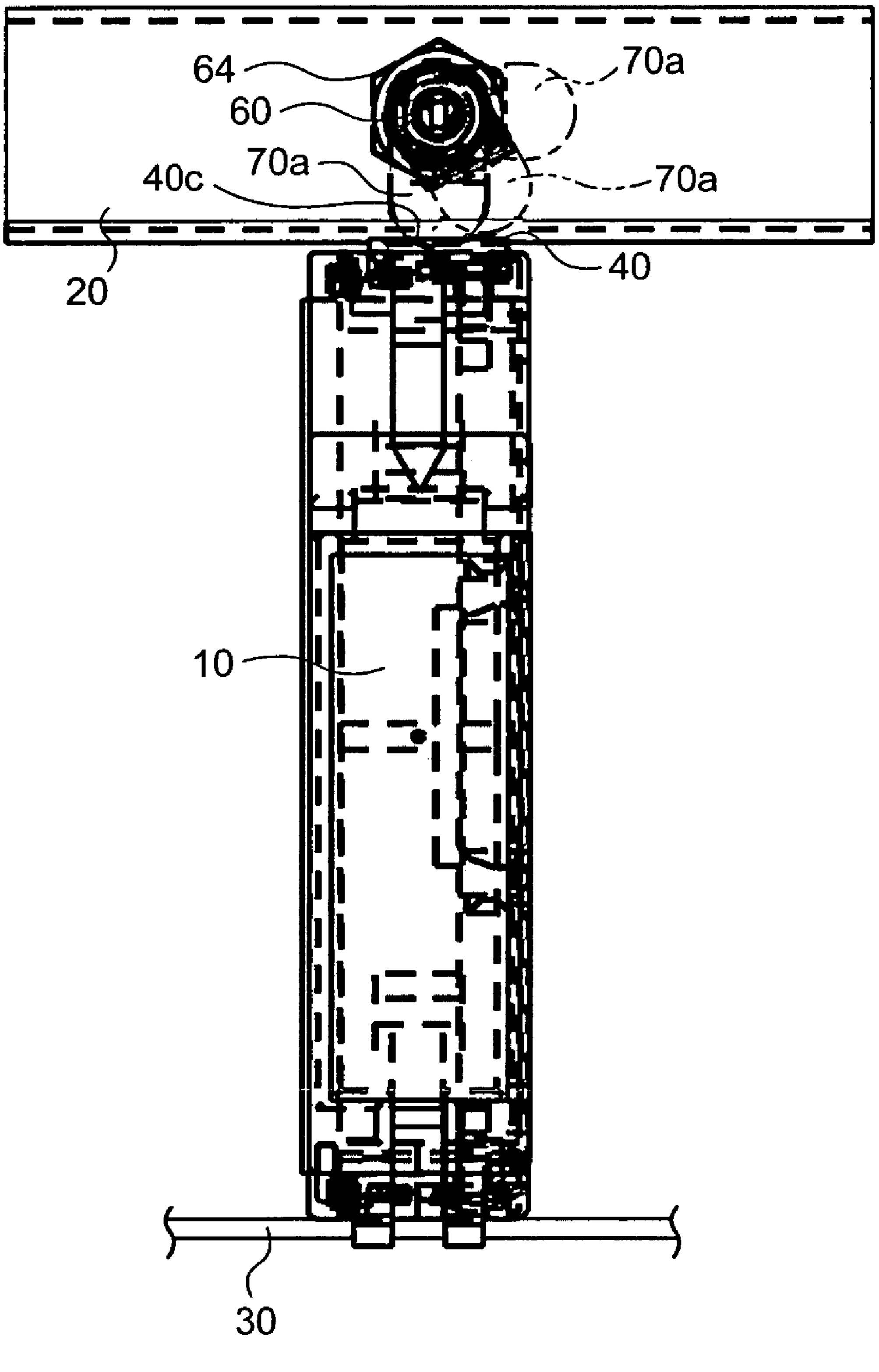
FIG. 6 is a front view of the installation structure shown in FIG. 1.
Figure 7:
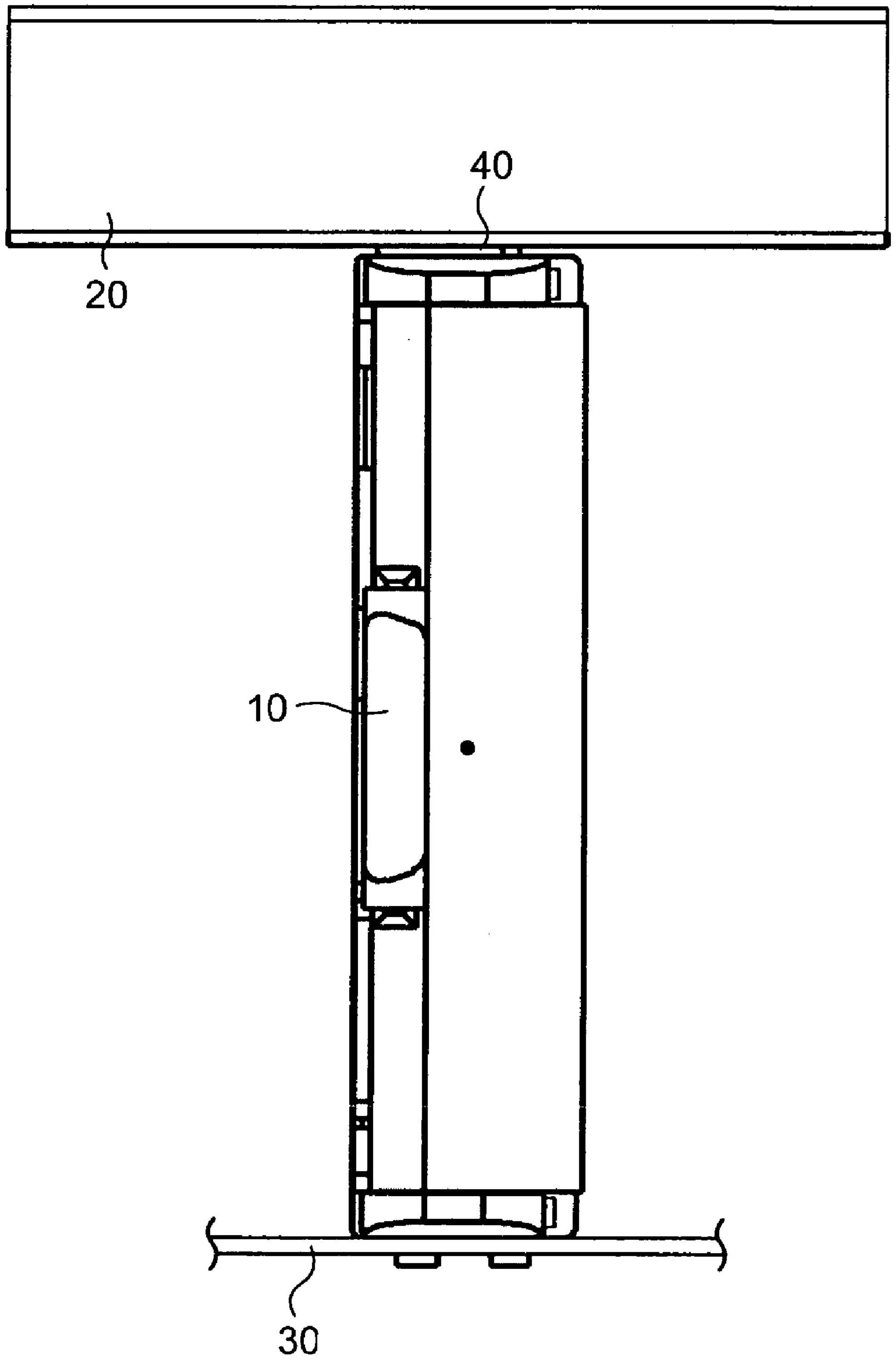
FIG. 7 is a rear view of the installation structure shown in FIG. 1.

FIG. 5 is a perspective view of a plate spring having a hook receiving hole, FIG. 6 is a front view of the installation structure of the information processor, and FIG. 7 is a rear view of the installation structure of the information processor. The same reference signs designate same or similar parts as those already explained and redundant explanation is omitted.

The first embodiment relates to a structure for installing an HDD (information processor) 10 in an electronic equipment such as a disk array device (not shown). In the first embodiment, a structure of installing one HDD 10 in the electronic equipment is explained. As shown in FIGS. 1, 6, and 7, the HDD 10 is installed between an upper chassis (housing) 20 and a lower chassis (housing) 30 of the electronic equipment. A minimum interval between the upper chassis 20 and the lower chassis 30 is set to be slightly larger than a height of the HDD 10.

As shown in FIGS. 1 to 3, a U-shaped supporting member 15 is provided at the HDD 10 so as to surround a ceiling surface, a front surface, and a bottom surface thereof. A recess portion 17 for providing a plate spring (biasing unit) 40, and a recess portion 18 for providing a plate spring (biasing unit) 50, are provided at a front portion and a rear portion of the ceiling surface of the supporting member 15, respectively.

A dowel 17*a* for positioning the plate spring 40, and a screw hole 17*b* for fixing the plate spring 40 by a screw 42, are provided in the recess portion 17. Similarly, a dowel 18*a* for positioning the plate spring 50, and a screw hole 18*b* for fixing the plate spring 50 by a screw 52, are provided in the recess portion 18.

Figure 10:
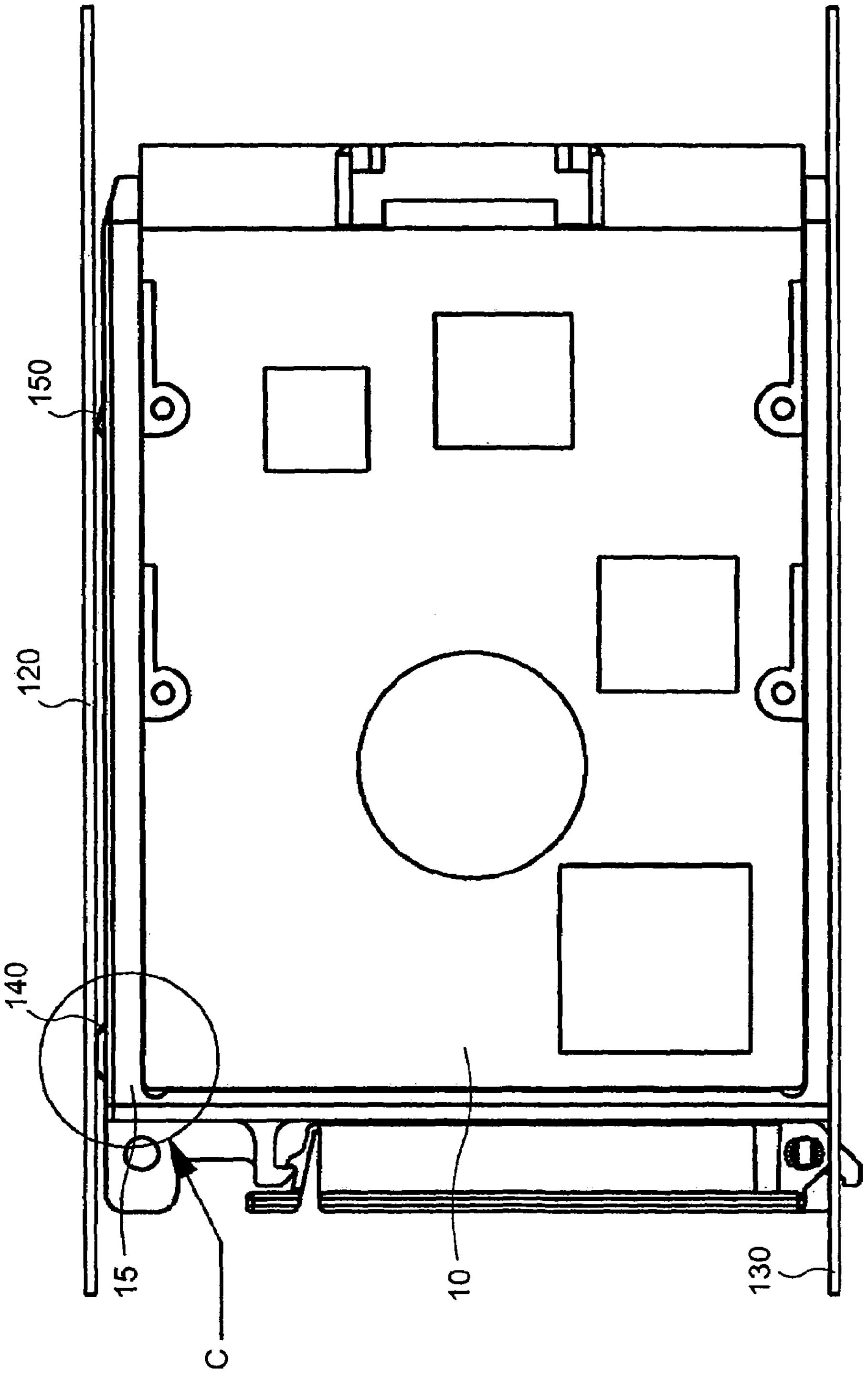
PRIOR ART FIG.10
FIG. 10 is a side view of a conventional installation structure of an information processor.
Figure 11:
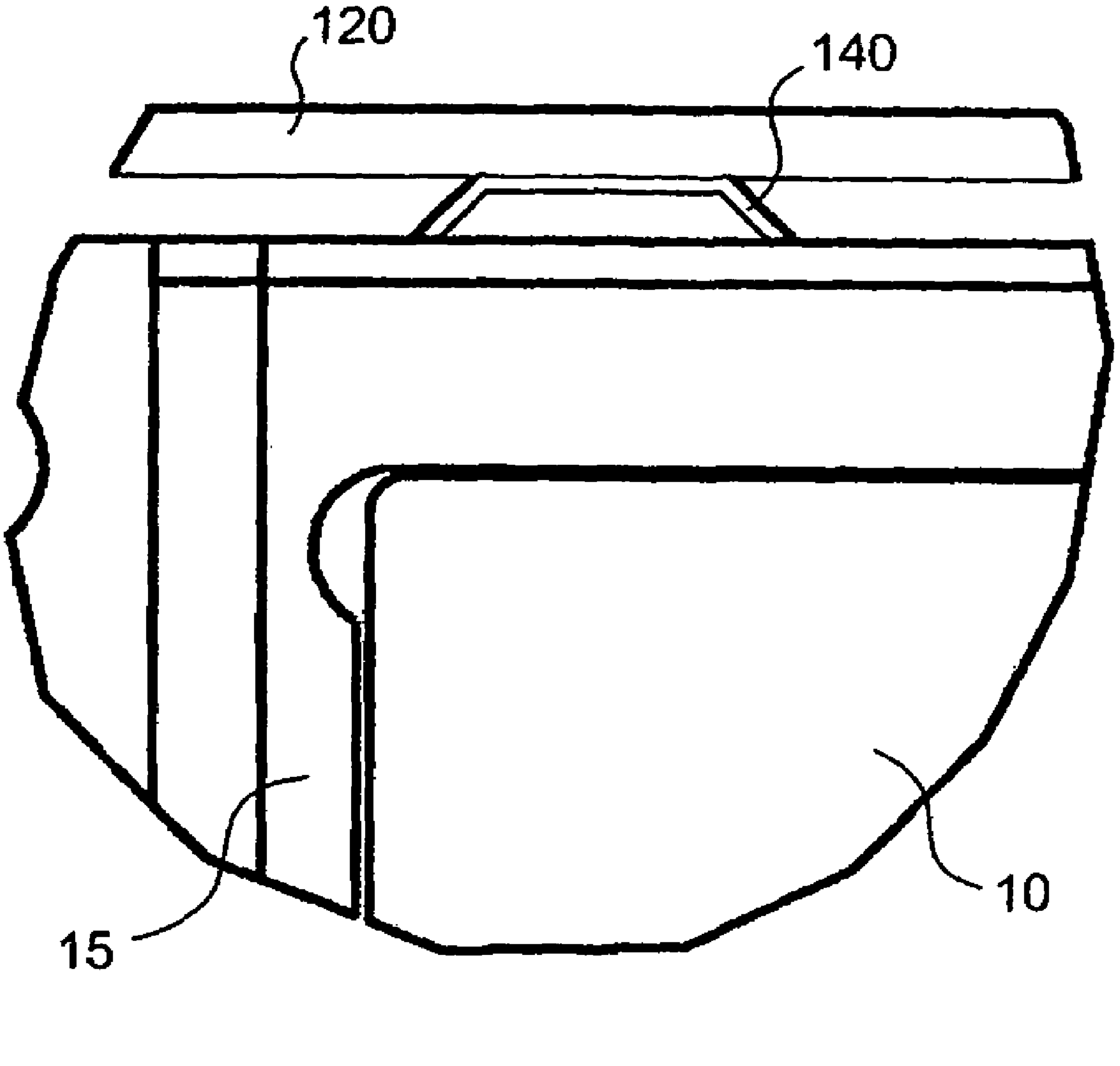
PRIOR ART FIG.11
FIG. 11 is an enlarged view of a portion C shown in FIG. 10.

The plate spring 40 is provided in order to obtain a biasing force that is greater than that of the above-described conventional plate spring 140 (see FIG. 10). A hook (protruding portion) 70 of a key 60 fixed to the upper chassis 20, which is shown in FIGS. 1 to 6, is used to press the plate spring 40 so that the biasing force is obtained. The strength (stiffness) of the plate springs 40 and 50 may be the same level or less than that of the conventional plate springs 140 and 150, because the hook 70 increases the biasing force of the plate spring 40 and reduces residual vibrations after installation of the HDD 10, for reasons that will be described later.

Since the plate springs 40 and 50 are provided at the front portion and the rear portion along a depth direction of the HDD 10, amplification of vibrations at the front and rear end portions of the HDD 10, where it is easy for vibrations to amplify, can be effectively suppressed.

As shown in FIGS. 2 to 5, the plate spring 40 has a dowel hole 40*a*, with which the dowel 17*a* of the recess portion 17 is engaged, a screw insert-through hole 40*b*, through which the screw 42 is inserted, and a hook receiving hole (engaging hole) 40*c*, with which one portion of a tongue piece portion 70*a* of the hook 70 is engaged. As shown in FIG. 2, the plate spring 50 has a dowel hole 50*a*, with which the dowel 18*a* of the recess portion 18 is engaged, and a screw insert-through hole 50*b*, through which the screw 52 is inserted.

As shown in FIGS. 1 to 4, the key 60 is fixed to a mounting hole 22 of the upper chassis 20 by a nut 64. As shown in FIGS. 3 and 4, the hook 70 of the key 60 rotates when a key (not shown) is inserted into a keyhole 62 and turned in one direction. A distal end of the tongue piece portion 70*a* thereby engages with the hook receiving hole 40*c* of the plate spring 40, abuts a peripheral edge portion of an opening of the hook receiving hole 40*c*, and pushes the plate spring 40.

That is, the residual vibrations of the HDD 10 decreases since the plate spring 40 is pushed by the tongue piece portion 70*a* of the hook 70 such that the biasing force thereof increases. Further, by locking the key 60 when the tongue piece portion 70*a* is engaged with the hook receiving hole 40*c*, the HDD 10 cannot be pulled-out from the chassis 20 and 30 unless locking of the key 60 is released. The basic structure of the key 60 can be realized by a known technique.

According to the installation structure of the information processor of the first embodiment, when the HDD 10 is positioned at a predetermined installation position, the plate spring 40 is pushed by the hook 70 such that the biasing force of the plate spring 40 increases and residual vibrations decreases. Therefore, the strength (stiffness) of the plate springs 40 and 50 may be the same level as or less than that of the conventional plate springs 140 and 150. Accordingly, when the HDD 10 is inserted and installed between the chassis 20 and 30, frictional force between the plate spring 50 and the upper chassis 20 does not increase. Therefore, usability during installation is not adversely affected.

When the plate spring 40 is pushed by the tongue piece portion 70*a* of the hook 70, the biasing force of the plate spring 40 increases and residual vibrations of the HDD 10 decreases. Further, the key 60 is locked when the tongue piece portion 70*a* is engaged with the hook receiving hole 40*c*. Therefore, the residual-vibration reducing mechanism and the security mechanism can be integrated so as to have a simple structure.

Since the key 60 and the plate spring 40, which are formed as the locking mechanism, are disposed at a front surface side of the electronic equipment, operations of locking and unlocking are easy and usability is good.

In the first embodiment, the HDD 10 is used as an example of the information processor. However, the present invention is not limited to this, and the information processor may be another device.

Although one HDD 10 is installed in the electronic equipment in the above explanation, the present invention is not limited to this, and two or more HDDs 10 can be installed by a structure similar to that described above.

Although the two plate springs 40 and 50 are provided along the depth direction of the HDD 10, the present invention is not limited to this, and three or more plate springs may be provided according to the residual vibrations to be reduced.

Although the plate springs 40 and 50 are used as a biasing unit, the present invention is not limited to this. The biasing unit may be structured by using a coil spring, rubber or the like, as far as the biasing unit reduces the residual vibrations by a predetermined biasing force.

Figure 8:
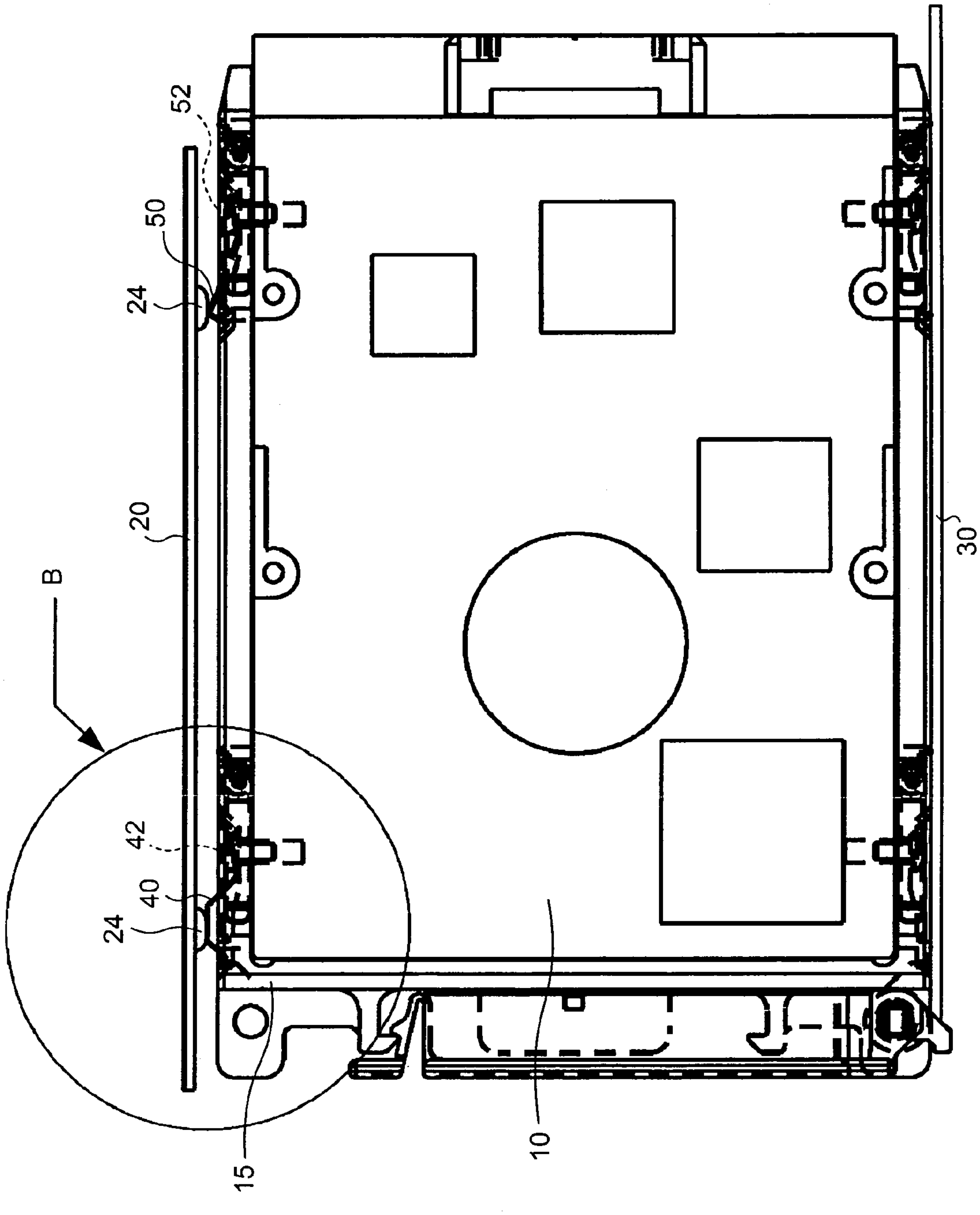
FIG. 8 is a side view of an installation structure of an information processor according to a second embodiment of the present invention.
Figure 9:
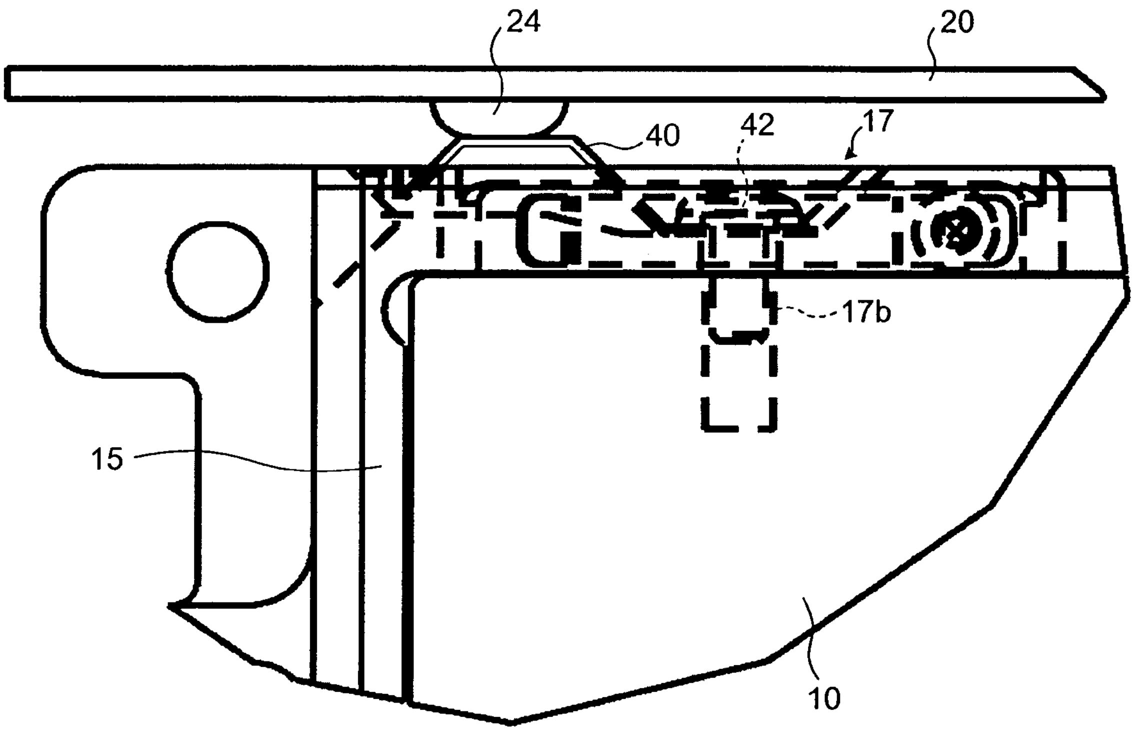
FIG. 9 is an enlarged view of a portion B shown in FIG. 8.

FIG. 8 is a side view of an installation structure of an information processor according to a second embodiment of the present invention, and FIG. 9 is an enlarged view of a portion B shown in FIG. 8. In the first embodiment, the residual-vibration reducing mechanism and the security mechanism are integrated, but in the second embodiment, only the residual-vibration reducing mechanism is provided.

As shown in FIGS. 8 and 9, the upper chassis 20 of the electronic equipment has, at positions facing the plate springs 40 and 50, protruding portions 24 that respectively bias the plate springs 40 and 50. The HDD 10 is installed in the electronic equipment in a state in which the plate springs 40 and 50 are biased by the protruding portions 24.

In the installation structure according to the conventional technique (see FIG. 10), the plate springs 140 and 150 always abut the upper chassis 20 while inserting he HDD 10 between the chassis 20 and 30. Therefore, a predetermined frictional force is always generated by the biasing forces of the plate springs 140 and 150.

In contrast, in the installation structure according to the second embodiment, in inserting the HDD 10 between the chassis 20 and 30, biasing forces are generated at the plate springs 40 and 50 only when the plate springs 40 and 50 abut the protruding portions 24. Therefore, frictional force due to the biasing units is not always received at the time of inserting the HDD 10. Accordingly, even if the strength of the plate springs 40 and 50 is set to be greater than that of the conventional plate springs 140 and 150 and the residual-vibration countermeasure is enhanced, the HDD 10 can be smoothly inserted between the chassis 20 and 30.

According to the installation structure of an information processor of the second embodiment, residual vibrations decrease without adversely affecting usability when installing the HDD 10 into the electronic equipment.

According to the present invention, frictional force due to the biasing unit is not always received when inserting the information processor into the electronic equipment. Therefore, the information processor can be smoothly inserted into the electronic equipment, and usability improves. After installation of the information processor, residual vibrations decrease since the protruding portion pushes the biasing portion.

According to the present invention, the number of protruding portions and biasing units that are provided is adjustable according to the amount of vibration to be reduced. Amplification of vibrations at front and rear end portions of the information processor, where it is easy for vibrations to amplify, is effectively suppressed.

According to the present invention, after the information processor is positioned at a predetermined installation position, the biasing unit is pushed by the protruding portion, and increases biasing force, and residual vibrations decreases. Accordingly, when the information processor is inserted and installed into a housing of the electronic equipment, frictional force between the biasing unit and the housing does not increase, and usability during installation improves.

According to the present invention, the biasing unit is pushed by the protruding portion, and increases biasing force, and residual vibrations decreases. Further, the protruding portion is locked when the protruding portion is engaged with the biasing unit. Therefore, the information processor cannot be pulled-out from the housing of the electronic equipment unless the locking is released, and security is ensured.

According to the present invention, the residual-vibration reducing mechanism and the security mechanism can be integrated to be a simple structure.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A structure for installing an information processor into an electronic equipment, comprising:

a biasing unit provided in the information processor; and a projection portion provided in a housing of the electronic equipment, wherein the protruding portion biases the biasing unit and the biasing unit applies a predetermined pushing force to the housing via the protruding portion when the information processor is installed in the housing.

2. The structure according to claim 1, wherein the information processor is slid along a direction of insertion when installing in the housing, and a plurality of the protruding portions and the biasing units are provided along the direction of insertion.

3. The structure according to claim 1, wherein the protruding portion is movably arranged, and biases the biasing unit when the information processor is installed at a predetermined position in the electronic equipment.

4. The structure according to claim 3, wherein the protruding portion and the biasing unit can be engaged with one another, and can be locked when the protruding portion and the biasing unit are engaged with one another.

5. The structure according to claim 4, wherein the biasing unit includes a plate spring, and has an engaging hole that engages with the protruding portion.

6. The structure according to claim 4, wherein the biasing unit and the protruding portion are arranged at a front surface of the electronic equipment.

* * * * *